Nov. 26, 1968
K. G. SCHROEDER
3,413,574
BROADBAND HIGH EFFICIENCY IMPEDANCE STEP-UP 180° PHASE SHIFT HYBRID CIRCUITS
Filed Oct. 3, 1966
3 Sheets-Sheet 1

INVENTOR.
KLAUS G. SCHROEDER
BY
Moody and Kintzinger
ATTORNEYS

INVENTOR.
KLAUS G. SCHROEDER
BY
Moody and Kintzinger
ATTORNEYS

INVENTOR.
KLAUS G. SCHROEDER

BY

Moody and Kintzinger
ATTORNEYS

United States Patent Office 3,413,574

Patented Nov. 26, 1968

3,413,574

BROADBAND HIGH EFFICIENCY IMPEDANCE STEP-UP 180° PHASE SHIFT HYBRID CIRCUITS

Klaus G. Schroeder, Dallas, Tex., assignor to Collins Radio Company, Cedar Rapids, Iowa, a corporation of Iowa Filed Oct. 3, 1966, Ser. No. 583,880
14 Claims. (Cl. 333—4)

ABSTRACT OF THE DISCLOSURE

A highly efficient impedance step-up 180° phase shift hybrid circuit usable as a signal combiner in one direction and as a divider in the opposite direction having two 4:1 transformers with bifilar transformer windings wound on individual cores, and with the two transformers, substantially mirror images of each other, connected in phase opposition.

Figure 1:
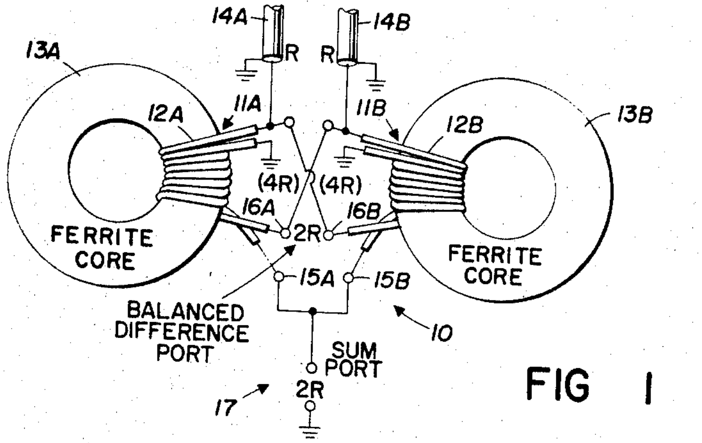

This invention relates in general to signal transmitting hybrid circuits, and in particular, to highly efficient impedance step-up 180° phase shift hybrid circuits usable as signal combiners in one direction and as dividers in the opposite direction and that, when employed as dividers, may be advantageously utilized for impedance averaging between the loads connected to the two output ports of each hybrid.

Hybrid circuits are useful in high power radar systems and in international broadcasting transmitter installations, VHF direction finding systems, surveillance arrays, or for FM and television transmitting systems. Such hybrids are also useful for feeding complementary pair element group antenna systems, and as building blocks for corporate feed structures in phased arrays of, for example, log periodic antennas, or less broadband elements arranged in an antenna system. However, there have been many problems presented with various existing hybrid circuits with the present trends toward higher power level capabilities, and in some instances, to greatly increased power handling capability requirements, and also frequency broadening to considerably extended broadband operational capabilities. With such intensified requirements, efficiency must be improved, cost minimized, weight conserved along with an emphasis on simplicity of construction, and adequate heat dissipation must be provided. Along with signal frequency broadband range operational capabilities, hybrids are called upon to provide impedance matching along with power division and power combining as, for example, with two-way dividers and combiners useful for feeding and loading power amplifier modules.

Applicant's new improved hybrids may be provided for a high frequency operational bandwidth of, for example, from 2 mc. to 35 mc. with, obviously, many applications in reception and transmission. With such capabilities they are particularly useful as the circuit devices providing signal division and/or combination as networks with, for example, phased array antennas since they advantageously reduce the effects of element mismatch and mutual coupling throughout extended broadband ranges of operation. Low power circuits may readily be built with existing hybrid and transformer techniques utilizing principles of dampening of resonances in broadband transformers with high loss high permeability ferrites. This technique, however, is unusable when any significant power level is required through feed networks, as for example with transmitting arrays, with the excessive losses that would occur in the ferrites of such systems. Various antenna arrays such as high directivity steerable beam HF arrays, for example, require feed networks with hybrids having good isolation between output ports in order to reduce the effects of antenna element impedance variation and minimize mutual coupling problems which may be quite significant particularly with extended bandwidth operational requirements.

It is, therefore, a principal object of this invention to provide highly efficient impedance step-up 180° phase shift hybrid circuits usable as signal combiners in one direction and as dividers in the opposite direction.

Another object is to provide hybrid circuits capable, when used as dividers, of being advantageously employed for impedance averaging between loads connected to the two output ports of each hybrid.

A further object is to provide with some such hybrid circuits at least two transformers in each hybrid with the original two output ports of the individual transformers connected in phase opposition such that the two voltages across these ports substantially cancel each other when the voltages applied at two other ports as inputs are in phase.

Further objects include the provision of a 2:1 impedance transformation between sum port and output ports through the use of two bifilar windings of substantially equal impedance on separate cores; the transformation of a balanced difference port to an unbalanced difference port via an additional core winding; increased signal power levels and improved efficiency along with adequate cooling at higher signal power levels; and the provision of greatly increased bandwidth handling capabilities.

Features of this invention useful in accomplishing the above objects include, in various embodiments, ferrite disc core sections with the core sections stacked, at least for the higher power levels of operation, to various heights, consistent with hybrid circuit transformer requirements imposed, and with cooling plates interspersed between ferrite core sections to insure adequate cooling at the higher signal power levels. It should be noted, however, that single disc toroid cores may be employed at lower operational signal power levels with such hybrid circuits. A typical hybrid of these hybrid circuits is in the form of two 4:1 transformers joined to form a hybrid "T" with the difference port of this hybrid created with connection of the original two output ports of the individual 4:1 transformers in phase opposition in such manner that the two voltages across these ports cancel if the voltages at two other ports of the hybrid are in phase. The output impedance of the difference port in this hybrid circuit is twice the impedance of each original port, or 2R, which is half the impedance level of the individual 4:1 transformer high impedance output points, and a sum port is provided by connecting together two terminals otherwise connected to ground. This provides a sum port terminal point the other side of which would be a terminal connection to ground, and with the symmetry at this sum port in phase signals that had been applied at two other ports add in phase. Furthermore, the impedance to ground from the common sum port terminal and the ground terminal is also 2R or twice the impedance of the in phase signal ports if they are of equal impedance. In some embodiments, the balanced difference port is transformed to an unbalanced difference port via an additional bifilar core winding on an additional core. A further feature is the utilization of closely bunched high current level high power winding low numerical turn winding configurations for developing maximum bandwidth handling capabilities with the respective signal power linking hybrid circuits.

Specific embodiments representing what are presently regarded as the best modes of carrying out the invention are illustrated in the accompanying drawings.

Figure 2:
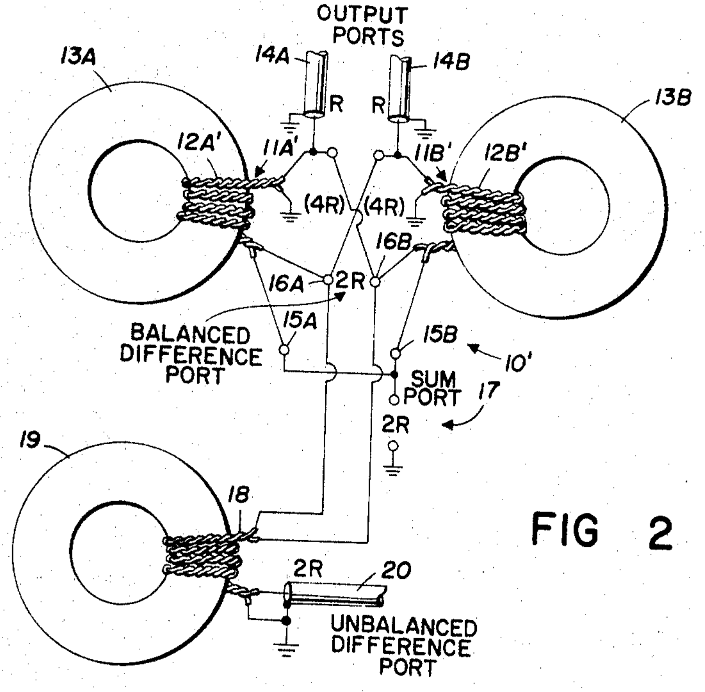
Figure 3:
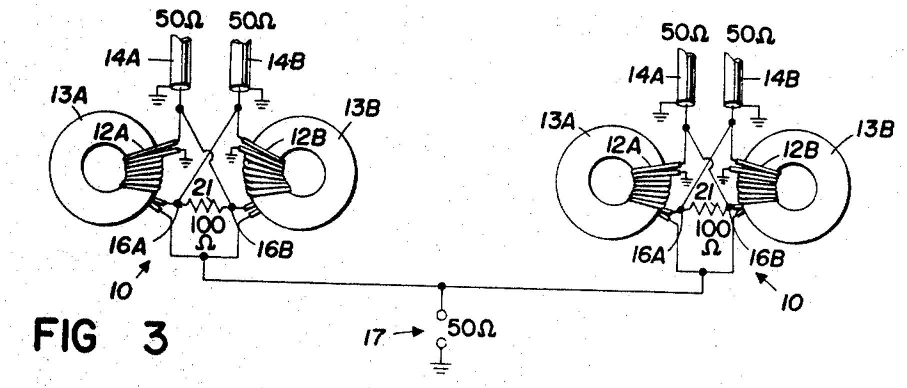
Figure 4:
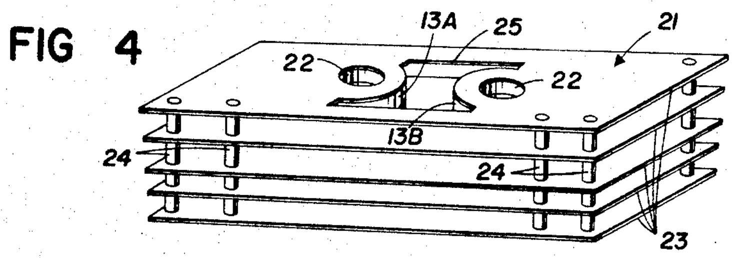
Figure 5:
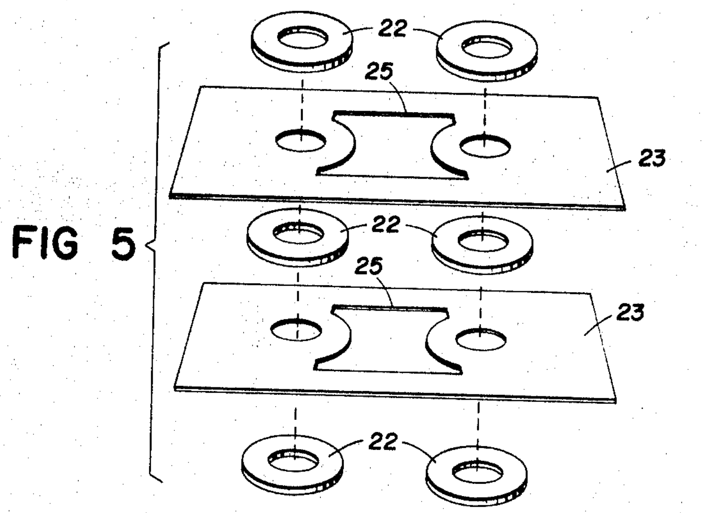
Figure 6:
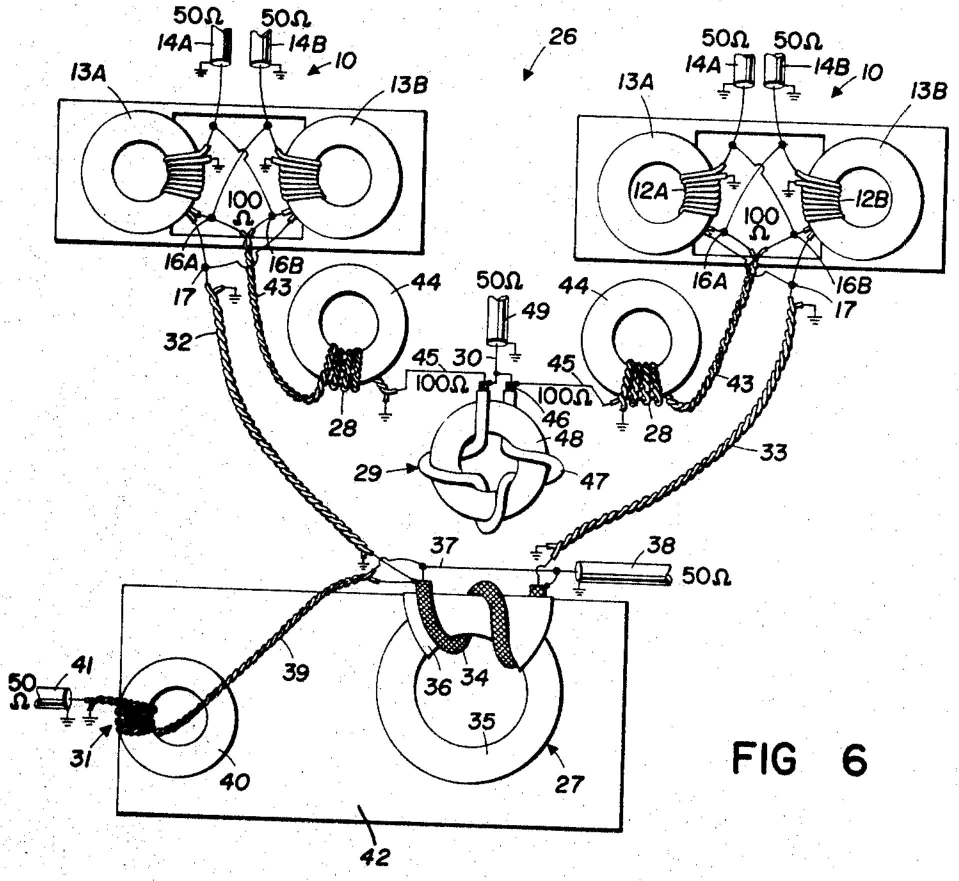
Figure 7:
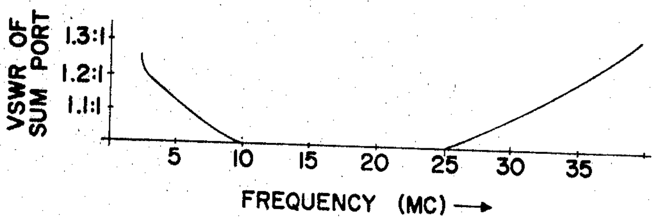

In the drawings:

FIGURE 1 represents a circuit diagram of a broadband high efficiency impedance step-up 180° phase shift hybrid circuit utilizing bunched parallel wire transformer windings;

FIGURE 2, a circuit diagram of a broadband high efficiency impedance step-up 180° phase shift hybrid circuit utilizing bunched twisted pair transformer windings, and with the balanced difference port transformed to an unbalanced difference port through an additional bifilar core winding on an additional core;

FIGURE 3, a matched four-way power divider with two 180° phase shift hybrid circuits paralleled at the sum ports;

FIGURE 4, a perspective view of a typical ferrite core and cooling plate stack such as used for a high signal power hybrid circuit such as that of FIGURES 1 or 2;

FIGURE 5, a partial exploded perspective view showing ferrite disc core sections and cooling plates such as used in an assembled stack such as that of FIGURE 4;

FIGURE 6, the circuit diagram of a complete four-way power divider package including two step-up 180° phase shift hybrid circuits; and FIGURE 7, a graph of VSWR at the sum port of a typical conduction cooled step-up hybrid circuit.

Referring to the drawings:

The broadband high efficiency impedance step-up 180° phase shift hybrid circuit 10 of FIGURE 1 includes two 4:1 transformers 11A and 11B which are substantially mirror images of each other connected in phase opposition. The transformers 11A and 11B include closely bunched parallel bifilar wire transformer windings 12A and 12B wound on ferrite toroid core structures 13A and 13B, respectively. Signal lines 14A and 14B function as signal power sources when the hybrid is used as a combiner, and as signal outputs when the hybrid circuit is used as a divider, and are shown as unbalanced coaxial signal lines. This is with the outer sheaths connected to ground and each inner conductor connected through the respective wire of the parallel wide windings 12A and 12B to sum port terminals 15A and 15B, respectively. The center conductors of lines 14A and 14B are also connected, line 14A to difference port terminal 16B and line 14B to difference port terminal 16A, and each on from the difference port terminals through a wire of the respective parallel windings 12A and 12B of the transformers 11A and 11B to ground. The sum port terminals 15A and 15B are connected together and to one terminal of sum port 17, the other terminal of which is connected to ground.

With the hybrid circuit 10 of FIGURE 1 and the individual transformers having a 4:1 impedance transformation from feedlines 14A and 14B to between these lines and the respective difference port terminals 16A and 16B, the individual 4:1 transformers are connected in phase opposition so that the two voltages across these ports cancel if the voltages at lines 14A and 14B are in phase and with the difference port having a characteristic impedance of 2R. At sum port 17 the signal contributions from lines 14A and 14B add in phase and the impedance to ground is 2R, or twice the impedance of either line 14A or 14B if these impedances are equal. This circuit provides 2:1 impedance transformation between sum port 17 and ports 14A and 14B through the use of the two bifilar windings on the separate cores. Further, the difference port at terminals 16A and 16B is a balanced difference port and sum port 17 is an unbalanced sum port.

Referring now to the embodiment of FIGURE 2, items the same as in the embodiment of FIGURE 1 are numbered the same and those members substantially the same or performing a similar function are given primed numbers. Furthermore, circuitry is provided for transforming the balanced difference port at terminals 16A and 16B to an unbalanced difference port. With the transformers 11A' and 11B' of this embodiment, the windings 12A' and 12B' are made of twisted wires in closely bunched relatively short wire length winding relation. For high average power capability and low cost 100 ohm parallel wire windings, as shown in the embodiment of FIGURE 1, or 100 ohm twisted pair windings 12A' and 12B', as shown in the embodiment of FIGURE 2, provide good results, because the conductor surfaces have good heat transfer and commercially available hook-up wires can be used. The operational signal results developed at difference port terminals 16A and 16B would be substantially the same in both the embodiments of FIGURES 1 and 2. However, the signals developed at the balanced difference port terminals 16A and 16B may be transformed from a balanced difference port to an unbalanced difference port of the same impedance, 2R, as compared to the characteristic impedance R at signal lines 14A and 14B. This is accomplished through the additional twisted bifilar wire coil 18 wound on an additional toroid core 19 with one of the two wires of the bifilar wire coil winding 18 terminating as the center conductor of a coaxial signal line 20 and the other terminating in a ground connection. While the transformer bifilar wire coil winding 18 shown in the FIGURE 2 embodiment is a twisted pair bifilar winding, a parallel wire bifilar winding transformer configuration could be used interchangeably therewith for translating the signal developed at the balanced difference port to an unbalanced difference port at line 20, and that either the twisted bifilar winding transformer or parallel bifilar winding transformer configuration could be employed with either the FIGURE 1 or 2 embodiments. It should be noted that the two conductors in the transformers could also be concentric conductors, or possibly, nonconcentric with one enclosed within the other, a hollow conductor, and with the two conductors in mutually insulated relation. Further, it should be noted that the wires of the bifilar parallel wire and twisted pair windings are insulated one from another, and that, most generally, they are in the form of insulation coated wires.

FIGURE 3 illustrates how a four-way power divider circuit may be constructed utilizing two 180° phase shift hybrid circuits such as illustrated in the embodiments of FIGURES 1 or 2 by connecting the sum ports of the respective hybrids in parallel. Resistors 21 interconnecting the difference ports 16A and 16B of each of the hybrid circuits are provided in order to dissipate energy differential developed at the difference port and not completely cancelled by the 180° phase shift relation and may be in multiple across the difference ports to meet the power loading required. In order to further illustrate the impedance relationships with respect to a four-way power divider utilizing 100 ohm transformer coil winding uniform impedances and 100 ohm resistors between the terminals of the difference ports typical characteristic impedances at signal lines are entered in FIGURE 3.

Referring now to FIGURES 4 and 5, a typical ferrite core and cooling plate stack structure 21 is shown such as would be employed for relatively high power broadband signal hybrid circuit usage. In structure 21 ferrite toroid core structures 13A and 13B are aligned stacks of ferrite toroid core sections 22 with cooling plates 23 interspersed between the individual core sections 22 and extending through and common to both ferrite toroid core structures 13A and 13B and with an additional cooling plate 23 provided at each outboard side of the core structures 13A and 13B. The core and cooling plate structure 21 is shown to be held in assembled state by through pin and/or bolt structures 24. Openings are provided in the conduction cooling plates 23 that match the size of the center openings of the core sections 22. These openings are provided with a center spacing such as to minimize transformer coil winding lead lengths consistent with proper spacing between the two transformer windings in a hybrid and for some air flow transversely through the structure. The center opening 25 provided in the conduction cooling plates 23 is shaped to accommodate the transformer core windings with the proper spacing as stated above, and for the flow of transversely directed cooling air therethrough. While it appears that toroid ferrite core section shapes are optimum, particularly at higher power levels, other ferrite core configurations may be employed particularly at lower power levels with operational functioning of such 180° phase shift hybrid circuits being substantially the same as has been described.

Various hybrid circuits have been built and tested for various operating power levels, for example, a 1 kw. HF hybrid employed just one core for each transformer section rather than a stack of cores with the core of each transformer section have a 2½ inch O.D. and 1½ inch I.D. and ½ inch thickness of ferromagnetic material and also employed two 1/16 inch cooling fins over the outer sides of the transformer cores, and employed eight turns in each hybrid coil of number 18 AWG wire. A 12½ kw. hybrid employed four cores per transformer stack of ferramic material Q–1 with the core sections having a 4 inch O.D. 2½ inch I.D. and ⅜ inch height each, five 1/16 inch thick cooling fins, and six turns per hybrid coil of number 18 AWG wire. A 25 kw. hybrid circuit utilizes three cores per stack of ferramic Q–2 material with a 5.8 inch O.D., 2.5 inch I.D. and 0.625 inch thickness each, four 1/16 inch thick aluminum cooling fins, and four turns per hybrid coil of number 12 AWG wire. A 100 kw. high frequency four-way hybrid divider utilizes five cores per stack of ferramic Q–2 material with a 5.8 inch O.D., 2.5 inch I.D., and 0.625 inch thickness per core section, six 1/16 inch thick aluminum cooling fins per hybrid, and three turns per hybrid coil of number 12 AWG wire.

A complete four-way power divider circuit 26 including two step-up 180° phase shift hybrids 10 is shown in FIGURE 6. While the difference ports of the four-way divider of FIGURE 3 were terminated internally and the sum ports simply paralleled, if isolation, and with it improved impedance performance, is required, as is provided for by the embodiment of FIGURE 6, a third hybrid 27 is used to join the sum ports 17 of the two step-up hybrids 10 instead of just simply paralleling the sum ports. This additional hybrid 27 joining the sum ports 17 has to be in the form of a step-down hybrid as shown. Further, to meet certain system application requirements the difference ports at terminals 16A and 16B of each hybrid 10 are advantageously unbalanced through the use of a 100 ohm unbalancing coil 28 and are thereby made available externally. Still further, they can also be combined as shown, externally with a step-down hybrid 29 to result in a 50 ohm sum port 30 for that step-down hybrid. Still further, the difference port of the relatively large step-down hybrid circuit 27, used to combine the two step-down hybrid sum ports 17, is shown to be made available externally through the use of a 50 ohm unbalancing coil circuit 31.

Twisted pair lines 32 and 33 are shown as interconnecting the respective sum ports 17 to the relatively large third hybrid circuit 27 with one wire of each of the twisted pair lines 32 and 33 grounded at both ends. The other wire of the twisted pair lines interconnect the non-ground side of the respective sum ports of hybrids 10 and, in the case of twisted pair line 32, the outer conductor at one end of a coaxial line 34 coiled about a toroid ferrite core structure 35 and, with a wire of line 33, the center conductor at the other end of the coiled coaxial line 34. Insulation 36 is provided between the outer conductor of coaxial line 34 and the ferrite core structure 35 in order to prevent shorting across the coil through metal of the core structure. The twisted pair line 32 end of the center conductor of coaxial line 34 is interconnected as part of a difference port 37 to the outer conductor of coaxial line 34 at the line 33 end thereof. Further, difference port 37 is connected to the center conductor of coaxial signal line 38, the outer sheath of which is grounded, thereby making available externally the two step-up hybrid sum ports 17 in combined form, at the difference port of the relatively large step-down hybrid circuit 27. The center conductor and the outer conductor of coaxial line 34 at the twisted pair line 32 end thereof are also connected through a twisted pair line 39 to the balancing coil circuit 31. This includes a winding of the twisted pair line 39 in coil form on a magnetic circuit, shown in FIGURE 6 to be a toroid core structure 40, and with the twisted pair line 39 terminating beyond the coil winding, with one wire connected to ground, and the other wire connected as a difference port to the center conductor of the unbalanced coaxial line 41. The difference port line 41 may be used just strictly as a 50 ohm terminating load, or partially for a connection for measurements with operating characteristic indicating instruments. While the toroid ferrite core structure 35 of hybrid circuit 27 and the ferrite core structure 40 of unbalanced coil circuit 31 are shown as toroid ferrite stacked core sections having a common conduction cooling plate 42, they could be magnetic circuit core structures presenting different magnetic circuit configurations and having different cooling arrangements than the common cooling plate 42 shown.

With respect to the 100 ohm unbalancing coils 28, one for each step-up hybrid 10, connected to the difference port terminals 16A and 16B thereof, a twisted pair line 43 extends from these difference port terminals of each step-up hybrid to a coil 28 for that hybrid, with the coil 28 a continuation of the twisted pair line 43. Each coil 28 is wound on a toroid ferrite magnetic circuit structure 44, with the twisted pair lines then terminating with a connection of one of the wires thereof to ground and the other as the 100 ohm characteristic impedance termination line 45. These two termination lines 45 are shown to be combined in step-down hybrid 29 with one connected to the center conductor of a coaxial line, the outer sheath of which is connected at the other end to the other terminating line 45. Coaxial line 46 is in effect substantially a bifilar winding 47 through a portion of its length about ferrite toroid structure 48. A direct connection between the outer sheath at one end and the center conductor at the other end of coaxial line 46 opposite to the connections of the lines 45 with line 46 comprise one side of the sum port output for the step-down hybrid circuit 29. This sum port terminal connection is to the center conductor of a coaxial line 49, with an outer conductor connected to ground, and with the line having a characteristic impedance of 50 ohms.

While parallel wire coil windings, twisted wire coil windings, and concentric conductor coil windings have been employed in various portions of the four-way power divider package of FIGURE 6, any one of the parallel, twisted or concentric conductor configurations may be employed interchangeably, particularly at lower power levels, with substantially the same operational results.

The plotted curve of FIGURE 7 of VSWR vs. frequency from a relatively low frequency of approximately 2.5 mc. to above 35 mc. indicates very good VSWR characteristics as measured at the sum port of a typical 180° phase shift hybrid circuit, such as employed in the four-way power divider package of FIGURE 6, in the matched four-way power divider circuit of FIGURE 3, or as illustrated in FIGURES 1 or 2.

Thus, it may be seen that this invention provides very effective and highly efficient impedance step-up 180° phase shift hybrid circuits useful in various configurations thereof as signal combiners in one direction and as dividers in the opposite direction for various power handling capabilities up to extremely high power handling capabilities. These may run as high as the 500 kw. signal power handling capability level, and, even with appropriate hybrid circuit design to as high as the megawatt signal power handling capability region. They are new hybrid circuits that when employed as dividers may be advantageously utilized for impedance averaging between loads connected to two output ports of each hybrid.

Whereas this invention is here illustrated and described with respect to specific embodiments thereof, it should be realized that various changes may be made without departing from essential contributions to the art made by the teachings hereof.

I claim:

1. In a step-up hybrid, two magnetic circuits; two-conductor transformer bunched coil windings, with at least one two-conductor transformer coil winding on each of said two magnetic circuits; two signal lines having predetermined characteristic impedances; a voltage potential reference source; a sum port with one side connected to said voltage potential reference source, and a common connection on the other side through a first conductor in each of both coil windings to the respective said signal lines; and connection also of each of said two signal lines directly across to a second conductor, respectively, of a bunched coil winding on the opposite magnetic circuit at the sum port end of the windings, and back through said second conductors through the respective transformer coil windings to said voltage potential reference source, and with the connections between the two-conductor transformer coil windings, other than the sum port connection, being substantially in phase opposition when the voltages at the said two signal lines are in phase.

2. The step-up hybrid of claim 1, wherein the connections between the transformer coil windings are in 180° phase shift relation for phase opposition when the voltages at said two signal lines are in phase.

3. The step-up hybrid of claim 1, wherein the two conductors of each bunched coil winding are mutually insulated one from the other, and from shorting from one coil turn to another.

4. The step-up hybrid of claim 3, wherein each conductor of the bunched transformer coil winding is an insulation coated wire, with the two wire conductors of each transformer coil winding arranged in parallel wire bifilar relation through each coil winding.

5. The step-up hybrid of claim 3, wherein each conductor of the bunched transformer coil windings is an insulation coated wire, with the two wire conductors of each transformer coil winding arranged in twisted pair relation through each coil winding.

6. The step-up hybrid of claim 1, wherein the individual transformer halves of the hybrid are 4:1 transformers; said two signal lines have substantially equal characteristic impedances; the sum port has substantially twice the impedance of either of the two signal lines; and with the ends of said second conductors at the sum port end of the coil windings being a difference port having substantially the same impedance as the sum port, and with the difference port terminals adjacent the sum port ends of the individual conductors of the windings being connected through said second conductors, respectively, to said voltage potential reference source.

7. The step-up hybrid of claim 6, wherein the difference port is a balanced difference port; and means is provided for translating the balanced difference port to an unbalanced difference port including, a third magnetic circuit; a two-conductor transformer coil winding on said third magnetic circuit with one conductor connected between one terminal of the balanced difference port and said voltage potential reference source, and the other conductor connected between the other terminal of the balanced difference port and a signal termination having substantially the same impedance to the said voltage potential reference source as the sum port.

8. The step-up hybrid of claim 6, including power dissipating means interconnecting the terminals of said difference port.

9. Two step-up hybrids of claim 8 connected in a circuit usable as a four-way power divider with the common connection of the two sum ports connected to a common terminal.

10. Two step-up hybrids of claim 6, connected in a four-way power divider circuit with, means connecting the common connection of the sum ports to a step-down hybrid circuit having a first conductor and second conductor transformer winding; the common connection of the sum port of one step-up hybrid being connected to one end of the first conductor and of the two-conductor winding, and the common connection of the sum port of the other step-up hybrid being connected to the second conductor at the other end of the two-conductor winding of the step-down hybrid transformer; and opposite ends of said first and second conductors in the step-down hybrid circuit from the respective ends connected to said sum ports being connected together as a difference port and to a signal terminal.

11. The four-way power divider circuit of claim 10, wherein the means connecting the common connection of the sum ports to the step-down hybrid circuit includes, a twisted insulated wire pair line with one conductor of each twisted pair line connected between the common connection of a sum port and the respective end of the step-down hybrid transformer winding, and the other conductor connected to the voltage potential reference source at both ends.

12. The four-way power divider circuit of claim 10, wherein the difference ports of each of said two step-up hybrids are unbalanced through an individual unbalancing coil; and with the difference port outputs of the two individual unbalancing coils combined with a step-down hybrid.

13. The step-up hybrid of claim 1, wherein the magnetic circuits include stacked ferrite magnetic core sections; and cooling plates are interspersed between the stacked magnetic core sections.

14. The step-up hybrid of claim 13, wherein the magnetic circuit core sections are toroidal shaped core sections; and said cooling plates are common to both magnetic circuits of the hybrid.

References Cited

UNITED STATES PATENTS

| | | | |
|---|---|---|---|
| 1,809,839 | 6/1931 | Field | 333—4 |
| 3,273,079 | 9/1966 | Curtis | 333—25 |

HERMAN KARL SAALBACH, *Primary Examiner.*

PAUL L. GENSLER, *Assistant Examiner.*